United States Patent
Francia et al.

(10) Patent No.: US 10,696,097 B2
(45) Date of Patent: Jun. 30, 2020

(54) TIRE COMPRISING A CARCASS REINFORCEMENT MADE UP OF TWO LAYERS

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Marc Francia, Clermont-Ferrand (FR); Yves Potin, Clermont-Ferrand (FR); Florian Vilcot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Grange-Paccot (CH)

( * ) Notice: Subject to any disclaimer, the term of this patent is extended or adjusted under 35 U.S.C. 154(b) by 538 days.

(21) Appl. No.: 15/535,908

(22) PCT Filed: Dec. 4, 2015

(86) PCT No.: PCT/EP2015/078724
§ 371 (c)(1),
(2) Date: Jun. 14, 2017

(87) PCT Pub. No.: WO2016/096491
PCT Pub. Date: Jun. 23, 2016

(65) Prior Publication Data
US 2018/0354306 A1 Dec. 13, 2018

(30) Foreign Application Priority Data
Dec. 16, 2014 (FR) ..................... 14 62471

(51) Int. Cl.
*B60C 9/04* (2006.01)
*B60C 15/06* (2006.01)
(Continued)

(52) U.S. Cl.
CPC ........ *B60C 9/0238* (2013.01); *B60C 15/0018* (2013.01); *B60C 15/0054* (2013.01);
(Continued)

(58) Field of Classification Search
CPC .......... B60C 9/02; B60C 9/0238; B60C 9/04; B60C 2009/0246; B60C 2009/0253;
(Continued)

(56) References Cited

U.S. PATENT DOCUMENTS 4,244,414 A 1/1981 Uemura et al.
4,972,893 A * 11/1990 Komai ................. B60C 9/08
152/553
(Continued)

FOREIGN PATENT DOCUMENTS

EP 351199 * 1/1990
EP 0463273 A1 1/1992
(Continued)

OTHER PUBLICATIONS

International Search Report corresponding to PCT/EP2015/078724, dated Feb. 24, 2016.

*Primary Examiner* — Justin R Fischer
(74) *Attorney, Agent, or Firm* — Dickingson Wright PLLC; Steven Hurles

(57) ABSTRACT

The tire has a load index that is at least 118 and two layers of reinforcing elements. Each of the layers has a breaking force per unit width that is higher than 2900 daN/dm. A minimum strength per unit width, measured for an elongation of less than 10%, of the second layer is greater than 20% of the minimum strength per unit width, measured for an (Continued)

elongation of less than 10%, of the first layer. The reinforcing elements of the first layer have a thread count that is higher than 300 tex. The reinforcing elements of the two layers have a thread count of less than 750 tex. The elongation of the reinforcing elements of the second layer are greater than 8% under a force of 20 daN and the secant elastic modulus values under tension at 10% elongation, Mt, Mj, satisfy the relationship Mt/Mj≥1.

11 Claims, 4 Drawing Sheets

(51) Int. Cl.
  *B60C 9/02* (2006.01)
  *B60C 15/00* (2006.01)
  *B60C 15/04* (2006.01)
(52) U.S. Cl.
  CPC ...... *B60C 15/0603* (2013.01); *B60C 15/0635* (2013.01); *B60C 2009/0246* (2013.01); *B60C 2009/0253* (2013.01); *B60C 2009/0276* (2013.01); *B60C 2015/044* (2013.01); *B60C 2015/0621* (2013.01)
(58) Field of Classification Search
  CPC .... B60C 2009/0416; B60C 2009/0433; B60C 2009/045; B60C 2009/0458; B60C 15/009; B60C 15/0018; B60C 15/060607; B60C 15/0628; B60C 2015/0617; B60C 2015/0621
  See application file for complete search history.

(56) References Cited

U.S. PATENT DOCUMENTS

| | | |
|---|---|---|
| 5,056,575 A | 10/1991 | Yamaguchi et al. |
| 6,595,257 B2 * | 7/2003 | Roget ................ B60C 15/0018 152/550 |
| 2007/0137754 A1 | 6/2007 | Westgate et al. |
| 2012/0298277 A1 | 11/2012 | Bondu |

FOREIGN PATENT DOCUMENTS

| | | | |
|---|---|---|---|
| EP | 1792752 A1 | | 6/2007 |
| FR | 2507970 A1 | | 12/1982 |
| FR | 2938793 | * | 5/2010 |
| GB | 2218676 | * | 11/1989 |
| JP | 7-164839 | * | 6/1995 |
| RU | 2496655 | * | 10/2013 |
| WO | 9727070 A1 | | 7/1997 |
| WO | 2010/060815 A1 | | 6/2010 |

* cited by examiner

TIRE COMPRISING A CARCASS REINFORCEMENT MADE UP OF TWO LAYERS

CROSS-REFERENCE TO RELATED APPLICATION

The present invention claims priority to PCT International Patent Application Serial No. PCT/EP2015/078724 filed Dec. 4, 2015 entitled "Tire Comprising A Carcass Reinforcement Made Up Of Two Layers," which claims the benefit of FR Patent Application Serial No. 1462471 filed Dec. 16, 2014, the entire disclosures of the applications being considered part of the disclosure of this application and hereby incorporated by reference.

BACKGROUND OF THE INVENTION

1. Field of the Invention

The present disclosure relates to a tire with a radial carcass reinforcement made of two layers of reinforcing elements.

Although not restricted to this type of application, the disclosure will be more particularly described with reference to a tire intended to be fitted to vehicles of the light goods vehicle (light truck) type, such as, for example, lorries or vans.

2. Related Art

In general, in tires of the light truck type, the carcass reinforcement is anchored on each side in the bead zone and is surmounted radially by a crown reinforcement.

The carcass reinforcement is usually made of two layers made up of textile reinforcing elements. Advantageously, when the two layers of crown reinforcement are turned up around a bead wire, the ends of the turn-ups of each of the layers are radially offset in order to avoid too great a proximity between ends of layers of reinforcing elements which are known to create regions of disturbance within the polymer compounds.

The crown reinforcement is made up of at least two layers, superposed and formed of threads or cords which are parallel within each layer and crossed from one layer to the next, making with the circumferential direction angles of between 10° and 45°. The said working layers that form the working reinforcement may also be covered by at least one layer referred to as a protective layer and formed of reinforcing elements, advantageously extensible and made of metal and referred to as elastic. It may also comprise a layer of metal threads or cords of low extensibility making with the circumferential direction an angle of between 45° and 90°, this layer, referred to as triangulation layer, being situated radially between the carcass reinforcement and the first crown layer referred to as working layer, made up of threads or cords that are parallel and at angles at most equal to 45° in absolute value. The triangulation layer forms with at least the said working layer a triangulated reinforcement which, under the various stress loadings it experiences, exhibits little deformation, the triangulation layer having the essential role of reacting the transverse compression loading to which all the reinforcing elements in the crown region of the tire are subjected.

Cords are said to be inextensible when the said cords exhibit, under a tensile force equal to 10% of the breaking force, a relative elongation at most equal to 0.2%.

Cords are said to be elastic when the said cords exhibit, under a tensile force equal to the breaking load, a relative elongation at least equal to 3% with a maximum tangent modulus of less than 150 GPa.

Circumferential reinforcing elements are reinforcing elements which make with the circumferential direction angles contained within the interval +2.5°, −2.5° about 0°.

The circumferential direction of the tire, or longitudinal direction, is the direction corresponding to the periphery of the tire and defined by the direction of running of the tire.

The transverse or axial direction of the tire is parallel to the axis of rotation of the tire.

The radial direction is a direction intersecting the axis of rotation of the tire and perpendicular thereto.

The axis of rotation of the tire is the axis about which it turns in normal use.

A radial or meridian plane is a plane containing the axis of rotation of the tire.

The circumferential mid plane, or equatorial plane, is a plane perpendicular to the axis of rotation of the tire and which divides the tire into two halves.

Document WO 97/27070 describes an example of tires for a vehicle of light truck type, the carcass reinforcement of which is made of two layers, each being turned up around a bead wire in each of the beads. In order to allow a radial offsetting of the ends of the turn-ups the semi-finished products corresponding to each of the layers of carcass reinforcement have different dimensions. On top of the need to have a higher number of semi-finished products, the manufacture of such a tire entails a complex device that allows the laying of two different layers of carcass reinforcement.

Document EP 1 792 752 describes a tire for a vehicle of light truck type the carcass reinforcement of which is made of two layers, just one of them being turned up around a bead wire in each of the beads. The second layer covers each of the turn-ups of the first layer in the bead regions. With such a design, there is no problem with the proximity of the ends of the turn-ups, but retention of the axially outermost layer of carcass reinforcement is trickier in certain types of duty, particularly because of the loads borne.

Document WO 97/27070 describes a tire for a vehicle of light truck type the carcass reinforcement of which is made up of two layers associated with a shorter third layer that secures everything to the bead wire requiring semifinished layers of different sizes and a relatively complex manufacturing process.

SUMMARY OF THE INVENTION AND ADVANTAGES

It is an object of the disclosure to provide tires for vehicles of the light truck type that are lighter in weight in comparison with the usual tires while at the same time affording satisfactory tire performance notably in terms of endurance or alternatively tires for vehicles of the light truck type that can be used under running conditions that are particularly severe in terms of overload.

This subject is achieved according to the disclosure by a tire for a vehicle of the light truck type with radial carcass reinforcement, having a load index higher than or equal to 118, comprising a crown reinforcement, itself capped radially by a tread, the said tread being connected to two beads, comprising a bead wire, by two sidewalls, the said carcass reinforcement being made up of two layers of textile reinforcing elements, a first layer of carcass reinforcement being turned up around the bead wire in each of the beads, the ends of the said first layer of carcass reinforcement being radially on the outside of the radially outermost point of the bead wire in each bead and the second layer of carcass reinforcement extending from one bead to the other without any turn-up around the bead wire in each of the beads, its ends being axially on the outside of the axially outermost point of the bead wire in each bead, the said tire comprising in each sidewall a first filling element, axially on the inside of the exterior surface of a sidewall and axially on the outside of the turn-up of the first layer of carcass reinforcement, and made of a rubber compound having a secant elastic modulus under tension at 10% elongation of Mj, each bead comprising a second filling element made of a rubber compound having a secant elastic modulus under tension at 10% elongation of Mt, extending the bead wire core radially towards the outside, each of the layers of carcass reinforcement having a breaking force per unit width higher than 2900 daN/dm, the minimum strength per unit width, measured for an elongation of less than 10%, of the second layer of carcass reinforcement being strictly greater than a value equal to 20% of the minimum strength per unit width, measured for an elongation of less than 10%, of the first layer of carcass reinforcement, the reinforcing elements of the first layer of carcass reinforcement having a thread count higher than 300 tex, the reinforcing elements of the two layers of carcass reinforcement having a thread count of less than 750 tex, the elongation of the reinforcing elements of the second layer of carcass reinforcement being greater than 8% under a force of 20 daN and the secant elastic modulus values under tension at 10% elongation, Mt, Mj, satisfying the relationship Mt/Mj≥1.

Within the meaning of the disclosure, a radial carcass reinforcement means that the reinforcing elements of the layers of carcass reinforcement are in a plane that with a radial plane makes an angle less than or equal to 10°, the two planes being secant along an axis perpendicular to the axis of rotation.

The breaking force per unit width of a layer of reinforcing elements and the strength per unit width of a layer of reinforcing elements are determined from measurements taken on reinforcing elements and from the density of reinforcing elements in the layer, which is itself defined by the number of reinforcing elements per unit width.

The density measurement is made by visually counting the number of threads present on a non-deformed specimen of fabric 10 cm wide. The number of threads counted is, directly, the fabric density values in threads/dm. The measurement is taken in the bead region of the tire, radially on the inside of the bead wire.

As far as the textile threads or cords are concerned, the mechanical properties are measured on fibers that have been subjected to prior conditioning. What is meant by "prior conditioning" is that the fibers have been stored for at least 48 hours, prior to measurement, in a standard atmosphere in accordance with European standard NF EN ISO 139 (temperature of 20+/−2° C.; relative humidity 65+/−4% RH). The mechanical properties in extension (breaking force at rupture, elongations under load) are measured in accordance with a specific measurement method using calibrated static tensile testing machines of the INSTRON or ZWICK make. The threads experience tension over an initial length between jaws of 400 mm to a nominal rate of 200 mm/min. The way in which the test results are expressed depends on the thread tested: the test result may either be a single individual value or the mean of 5 individual values. The minimum strength measurement is determined by the minimum gradient of the elongation curve between 0 and 10% over a range of 2%.

The mechanical properties of the textile reinforcing elements are measured on a new tire.

The tire thus defined according to the invention may be fitted to vehicles of the light truck type and is lighter in weight in comparison with the usual tires with performance in terms of endurance that is satisfactory in relation to that of the more usual tires when running under conditions that are very severe in terms of overload. The tire according to the invention moreover makes it possible to design tires capable of carrying heavier loads with satisfactory endurance performance.

For preference according to the disclosure, in a meridian plane, a single layer of reinforcing elements is present axially between the exterior surface of the tire and the turn-up of the first layer of carcass reinforcement in a zone delimited radially towards the outside by the axial direction passing through the end of the turn-up of the first layer of carcass reinforcement and radially towards the inside by the axial direction passing through the intersection of the straight line passing through center O of curvature of the zone of the tire that comes to bear on the rim flange, intended to accept the tire, and making an angle of 45° with the axial direction and the turn-up of the first layer of carcass reinforcement.

In order to form a carcass reinforcement layer, it is common practice to weld together the ends of the semi-finished element of which it is made. It is also common practice to form an overlap between the two ends to reinforce the said weld. Within the meaning of the invention, the region of overlap forms just one single solitary layer even though there are two thicknesses of the said layer.

The use of two layers of textile reinforcing elements made in accordance with the invention from which to form the carcass makes it possible, while meeting the design criteria for such tires which are, notably, performance in terms of endurance, to propose, because of the materials and structure of the tire, a tire that is lighter in weight than the usual tires. Specifically, the inventors have notably been able to demonstrate that the choice of two layers of textile reinforcing elements from which to form the carcass reinforcement of the tire according to what is being proposed by the invention leads to a tire structure that is more flexible than that of usual tires, thus making it possible to create a bead that is more lightweight. Specifically, it is common practice in order to allow such tires to have satisfactory endurance, to stiffen the lower region of the tire, which usually results in relatively large bead thicknesses which make the tire appreciably heavier.

Furthermore, usual tires which usually comprise a metal carcass reinforcement have their endurance performance severely impaired when used with a high degree of overload. This is because the deflection caused by such overload causes damage to the metallic structure of the carcass reinforcement. The more flexible structure of textile carcass reinforcing layers promotes better endurance performance in such use.

Moreover, the tire according to the disclosure comprises just one layer of carcass reinforcement turned up around the bead wires and this improves the results in terms of endurance because of the absence of several layer ends close together in the region of the bead that will bear against the rim flange.

The breaking force per unit width values of higher than 2900 daN/dm for each of the layers of carcass reinforcement notably give the tire its ability to withstand the inflation pressure.

The conditions of minimum stiffness per unit width, measured for an elongation of less than 10%, between the layers of carcass reinforcement also mean that the distribution of absorbed load between the layers of carcass reinforcement can be made such that the first layer of carcass reinforcement does not contribute to excess shearing of the surrounding rubber compounds in the bead region and thus does not detract from the performance in terms of endurance.

Advantageously, the minimum strength per unit width, measured for an elongation of less than 10%, of the second layer of carcass reinforcement is less than or equal to a value equal to 100% of the minimum strength per unit width, measured for an elongation of less than 10%, of the first layer of carcass reinforcement, so as to further optimize performance in terms of endurance.

The choice of reinforcing elements of the second layer of carcass reinforcement exhibiting an elongation, under a force of 20 daN, greater than 8% further encourages performance in terms of endurance notably because of reinforcing elements that are better able to withstand compression when the tire is being driven on, notably when used under considerable overload which subject the tire to great deformation deflection.

The choice of reinforcing elements for the two layers of carcass reinforcement having a thread count below 750 tex makes a contribution to lightening the weight of the tire in comparison with the usual tires while at the same time ensuring tire performance that is satisfactory notably in terms of endurance.

According to one preferred embodiment of the invention, the reinforcing elements of the first layer of carcass reinforcement have a thread count higher than 400 tex.

According to an advantageous alternative form of the invention, the reinforcing elements of the first layer of carcass reinforcement are different from those of the second layer of carcass reinforcement.

The choice of the relationship Mt/Mj≥1, satisfied by the modulus values of Mt and Mj, further contributes to encouraging the endurance performance of the tire.

According to one advantageous embodiment of the invention, with the second layer of carcass reinforcement being made up of reinforcing elements between two skim layers formed of rubber compound having a secant elastic modulus under tension at 10% elongation of $Mc_2$, the secant elastic modulus values under tension at 10% elongation, $Mc_2$, Mj, satisfy the relationship 0.6≤$Mc_2$/Mj≤4 and preferably satisfy the relationship $Mc_2$/Mj<4.

As far as the rubber compounds are concerned, the modulus measurements are performed under tension in accordance with the standard AFNOR-NFT-46002, September 1988: the nominal secant modulus (or apparent stress, in MPa) is measured in second elongation (i.e. after an accommodation cycle) at 10% elongation (standard temperature and humidity conditions in accordance with standard AFNOR-NFT-40101, December 1979).

The mechanical properties of the textile reinforcing elements are measured on new tires.

Such relationships between the stiffnesses of the skim layers of the second layer of carcass reinforcement and of the first filling element encourage good tire endurance performance notably by limiting the effects of shear between the said rubber compounds.

When notably the tire is subjected to running conditions that are particularly harsh for example in terms of load, the secant elastic modulus values under tension at 10% elongation, $Mc_2$, Mj, satisfy the relationship 1≤$Mc_2$/Mj.

Advantageously also according to the invention, in order to encourage the tire endurance performance, with the layers of carcass reinforcement being made up of reinforcing elements between two skim layers formed of rubber compound having a secant elastic modulus under tension at 10% elongation, denoted $Mc_1$ for the first layer of carcass reinforcement and $Mc_2$ for the second layer of carcass reinforcement respectively, the secant elastic modulus values under tension at 10% elongation $Mc_1$, $Mc_2$ satisfy the relationship $Mc_2/Mc_1$≤4.6.

When notably the tire is subjected to running conditions that are particularly harsh for example in terms of load, the secant elastic modulus values under tension at 10% elongation, $Mc_1$, $Mc_2$, satisfy the relationship 1≤$Mc_2/Mc_1$.

According to one preferred embodiment of the disclosure, in a meridian plane, in each bead, the tire comprises a layer of reinforcing elements made of aromatic polyamide in contact with the said first layer of carcass reinforcement over the entire length thereof, at least a part being radially on the inside of the bead wire and of which the ends are radially on the outside of the geometric center of the bead wire and the said first layer of carcass reinforcement being interposed between the bead wire and the layer of reinforcing elements made of aromatic polyamide.

Such a layer of reinforcing elements made of aromatic polyamide makes it possible during prolonged runs to preserve the first layer of carcass reinforcement which is subjected in the region of the bead and notably under the bead wire to substantial increases in temperature, its reinforcing elements experiencing striction phenomena. Specifically, the layer of reinforcing elements made of aromatic polyamide first of all forms thermal protection for the first layer of carcass reinforcement and furthermore because of the lack of sensitivity of reinforcing elements made of aromatic polyamide to temperature and because of their great stiffness, it protects the reinforcing elements of the first layer of carcass reinforcement from the striction phenomena.

The layer of reinforcing elements made of aromatic polyamide also encourages the endurance performance of the tire, notably during prolonged runs. Furthermore, it is also favorable to further limit the risks of degradation of the tire when running with overload, and notably the risk of rolling-off of the first layer of carcass reinforcement.

One alternative form of embodiment also makes the provision that in any meridian plane, in each bead, the tire comprises a retention reinforcement surrounding the bead wire and a volume of rubber compound directly in contact with the bead wire. Advantageously, the retention reinforcement is a layer of reinforcing elements made of aromatic polyamide fibers oriented substantially radially. Such a retention reinforcement is for example described in patent EP 2370275.

Such a retention layer surrounding the bead wire and a volume of rubber compound directly in contact with the bead wire also encourages the endurance performance of the tire notably when the tire is subjected to very high pay loads and/or high inflation pressures notably by limiting the phenomena whereby the first layer of carcass reinforcement is indented by the bead wire.

Advantageously according to the invention, the bead wire is of the round wire pack bead wire TPFR type, of hexagonal shape.

One advantageous alternative form of the invention also makes the provision when running under heavy load, that the first layer of carcass reinforcement forming a main part between the two bead wires and a turnup in each of the beads, the turnup of the first layer of carcass reinforcement is distant from the main part by a distance d of between 0.5 and 3.2 mm over a length of at least 15 mm.

According to this alternative form of embodiment of the invention, the turnup of the first layer of carcass reinforcement is pressed firmly against the main part of the first layer of carcass reinforcement. The second layer of carcass reinforcement is therefore brought closer to the main part of the first layer of carcass reinforcement and thus away from that region of the tire that comes to bear against the rim flange; it is therefore less heavily loaded in compression during running. The performance in terms of endurance is thus improved. Furthermore, this type of design is also good at combatting the risks of the first layer of carcass reinforcement rolling off, more particularly when excessively loaded in the event of an overload and/or high inflation pressures.

According to a preferred embodiment of the disclosure, the direction passing through the center O of curvature of the zone of the tire that comes to bear against the flange of the rim intended to accept the tire, and the axially external end of the layer of reinforcing elements made of aromatic polyamide makes an angle α of between 0 and 45° with the axial direction.

For preference also according to the disclosure, the direction passing through the center O of curvature of the zone of the tire intended to come to bear against the flange of the rim intended to accept the tire and the axially interior end of the layer of reinforcing elements made of aromatic polyamide makes an angle β of between 0 and 20° with the axial direction.

Such positionings of the ends of the layer of reinforcing elements made of aromatic polyamide further encourage the performance of the tire in terms of endurance.

For preference also according to the disclosure and again with a view to improved endurance performance, in any meridian plane, in each bead, the end of the second layer of carcass reinforcement is axially on the outside of the geometric center of the bead wire and the direction passing through the geometric center of the bead wire and the end of the second layer of carcass reinforcement makes an angle θ of less than 50° with the axial direction.

An advantageous alternative form of the invention makes the further provision that the distance between the end of the second layer of carcass reinforcement and the axially outermost end of the layer of reinforcing elements made of aromatic polyamide is greater than 5 mm. Advantageously also, the overlap between the second layer of carcass reinforcement and the layer of reinforcing elements made of aromatic polyamide is at least 5 mm.

BRIEF DESCRIPTION OF THE DRAWINGS

Further details and advantageous features of the invention will become apparent hereinafter from the description of some exemplary embodiments of the invention making reference to FIGS. 1 to 4 which depict.

DETAILED DESCRIPTION OF THE ENABLING EMBODIMENTS

In order to make them easier to understand, the figures have not been drawn to scale.

Figure 1:
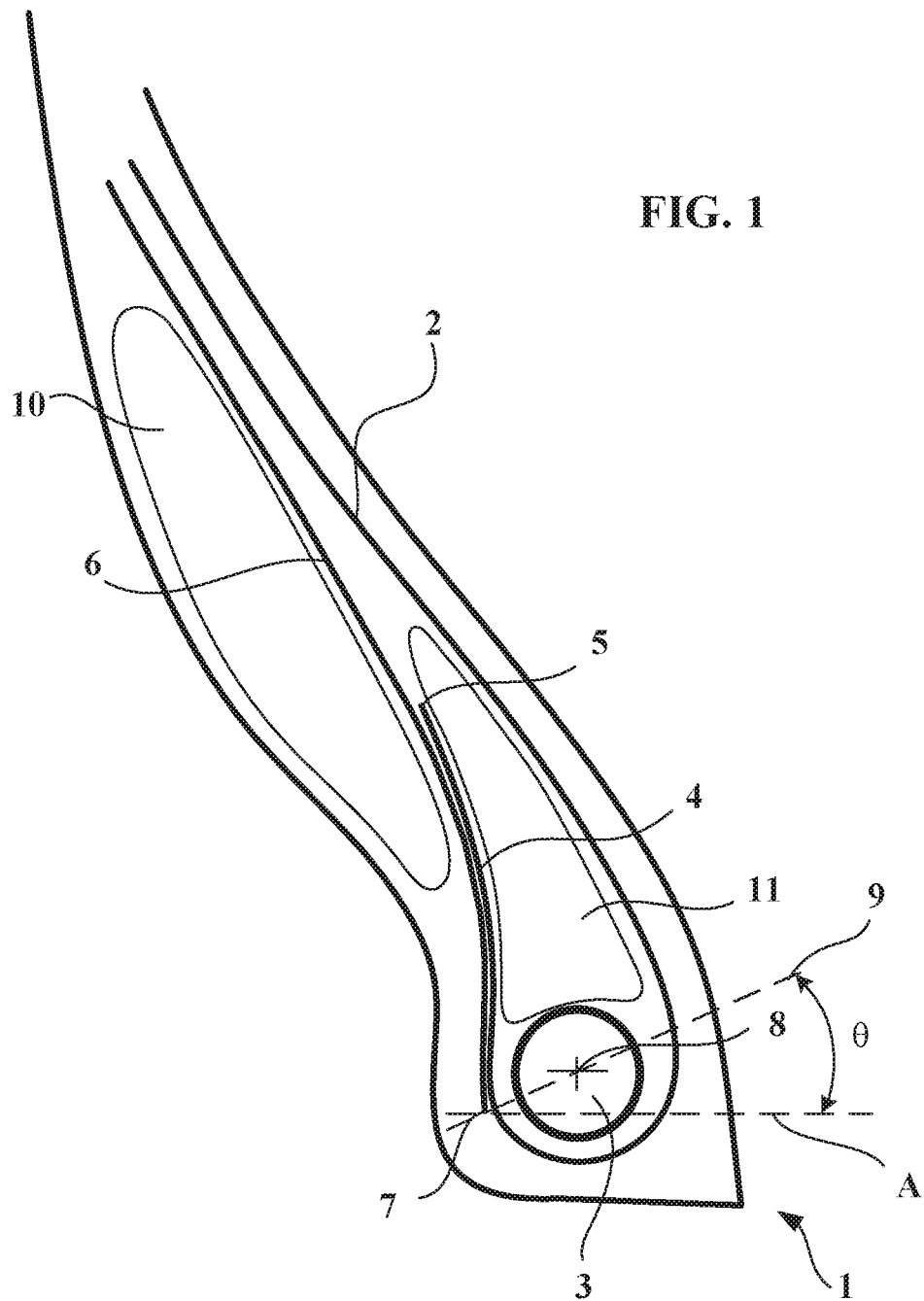
FIG. 1 a schematic depiction of a view in cross section of a bead according to a first alternative form of embodiment of a tire according to the invention, FIG. 2 a schematic depiction of a view in cross section of a bead according to a second alternative form of embodiment of a tire according to the invention, FIG. 3 a schematic depiction of a view in cross section of a bead according to a third alternative form of embodiment of a tire according to the invention, FIG. 4 a schematic depiction of a view in cross section of a bead according to a fourth alternative form of embodiment of a tire according to the invention.

FIG. 1 is a schematic depiction in cross section of a bead 1 of a tire of light truck type of size 7.50R16. At this bead 1 of the tire there is part of the first layer of carcass reinforcement 2 wound around a bead wire 3 to form a turnup 4 having an end 5. Also depicted is part of the second layer of carcass reinforcement 6 the end 7 of which is axially on the outside of the geometric center 8 of the bead wire 3.

The angle θ formed by the direction 9, passing through the geometric center of the bead wire and the end of the second layer of carcass reinforcement, and the axial direction A is equal to 30° and therefore less than 50°.

The layers of carcass reinforcement 2 and 6 are made up of reinforcing elements between two skim layers made of rubber compound having secant elastic modulus values under tension at 10% elongation of $Mc_1$ for the first layer of carcass reinforcement and $Mc_2$ for the second layer of carcass reinforcement, respectively.

The secant elastic modulus under tension at 10% elongation, $Mc_1$, of the first layer of carcass reinforcement 2 is equal to 3.3 MPa.

The secant elastic modulus under tension at 10% elongation, $Mc_2$, of the second layer of carcass reinforcement 6 is equal to 12.5 MPa.

The ratio $Mc_2/Mc_1$ is equal to 3.8 and therefore well below 4.6.

This FIG. 1 also shows a first filling element 10, axially on the inside, of the sidewall and axially on the outside of the turnup of the first layer of carcass reinforcement 4, made of a rubber compound having a secant elastic modulus under tension at 10% elongation, Mj, equal to 7.8 MPa.

The ratio $Mc_2/Mj$ is equal to 1.6 and therefore indeed comprised between 0.6 and 4.

The bead 1 also comprises a second filling element 11 extending the bead wire core radially towards the outside and made of a rubber compound having a secant elastic modulus under tension at 10% elongation, Mt, equal to 7.8 MPa. The second filling element 11, has, in any meridian plane, a substantially triangular cross section.

The ratio Mt/Mj is equal to 1 and therefore indeed greater than or equal to 1.

Figure 2:
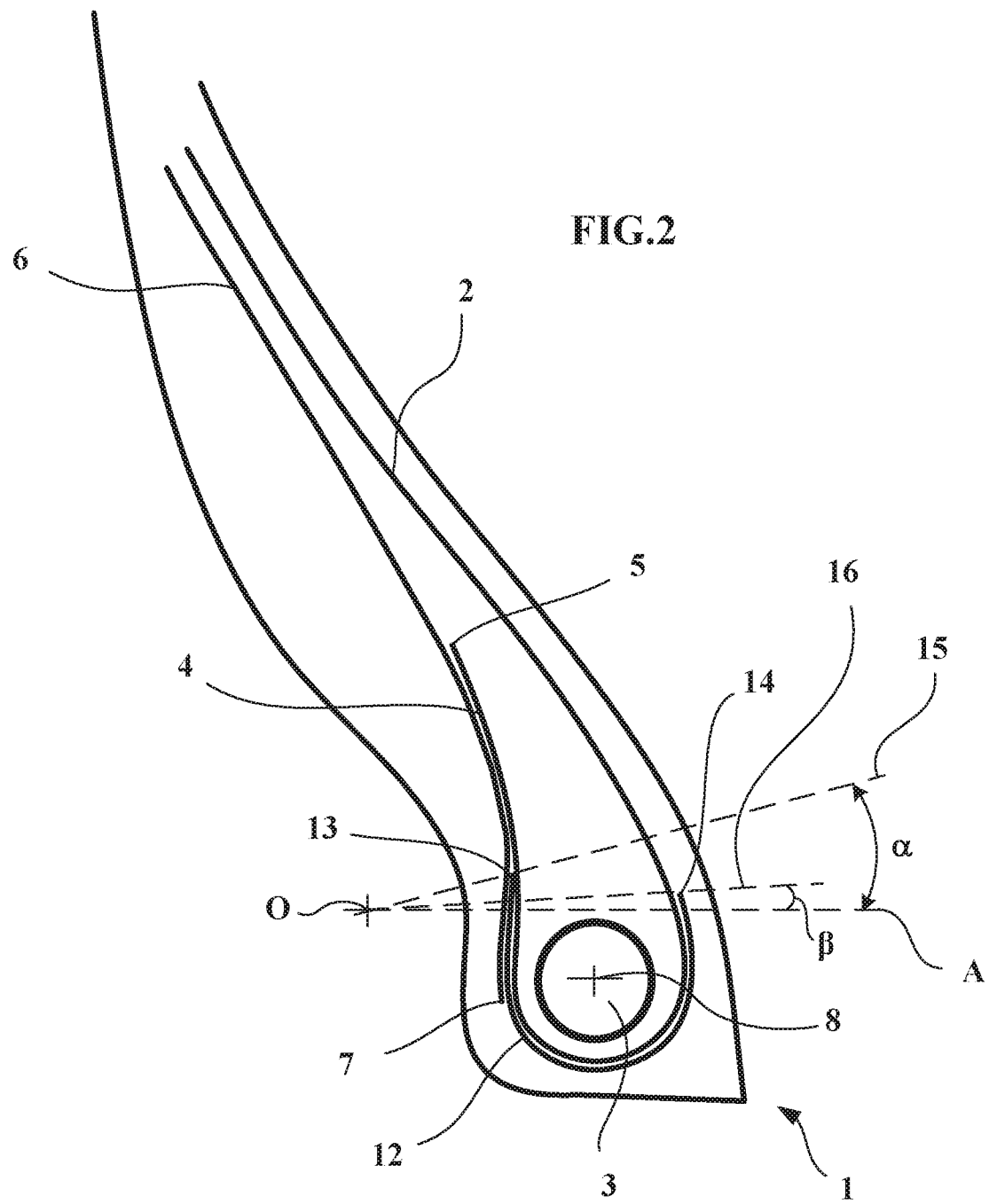

FIG. 2 illustrates a schematic depiction of a view in cross section of a bead 1 according to a second alternative form of embodiment of a tire according to the invention. This second alternative form differs from the first alternative form illustrated in FIG. 1 through the presence of a layer 12 of reinforcing elements made of aromatic polyamide. This layer 12 of reinforcing elements made of aromatic polyamide is arranged over its entire length in contact with the said first layer of carcass reinforcement 2 so that at least part of the layer 12 is radially on the inside of the bead wire 3 and so that the ends 13, 14 of the layer 12 are radially on the outside of the geometric center of the bead wire. The positioning of the layer 12 is such that the first layer of carcass reinforcement 2 is interposed between the bead wire 3 and the layer 12 of reinforcing elements made of aromatic polyamide.

The angle α formed by the direction 15, passing through the center O of the curvature of the flange of the rim intended to accept the tire and the axially outer end 13 of the layer 12 of reinforcing elements made of aromatic polyamide, and the axial direction A is equal to 20°. The angle α is therefore comprised between 0 and 45°.

The angle β formed by the direction 16 passing through the center O of the curvature of the flange of the rim intended to accept the tire and the axially inner end 14 of the layer 12 of reinforcing elements made of aromatic polyamide, and the axial direction A is equal to 10°. The angle β is therefore comprised between 0 and 20°.

Figure 3:
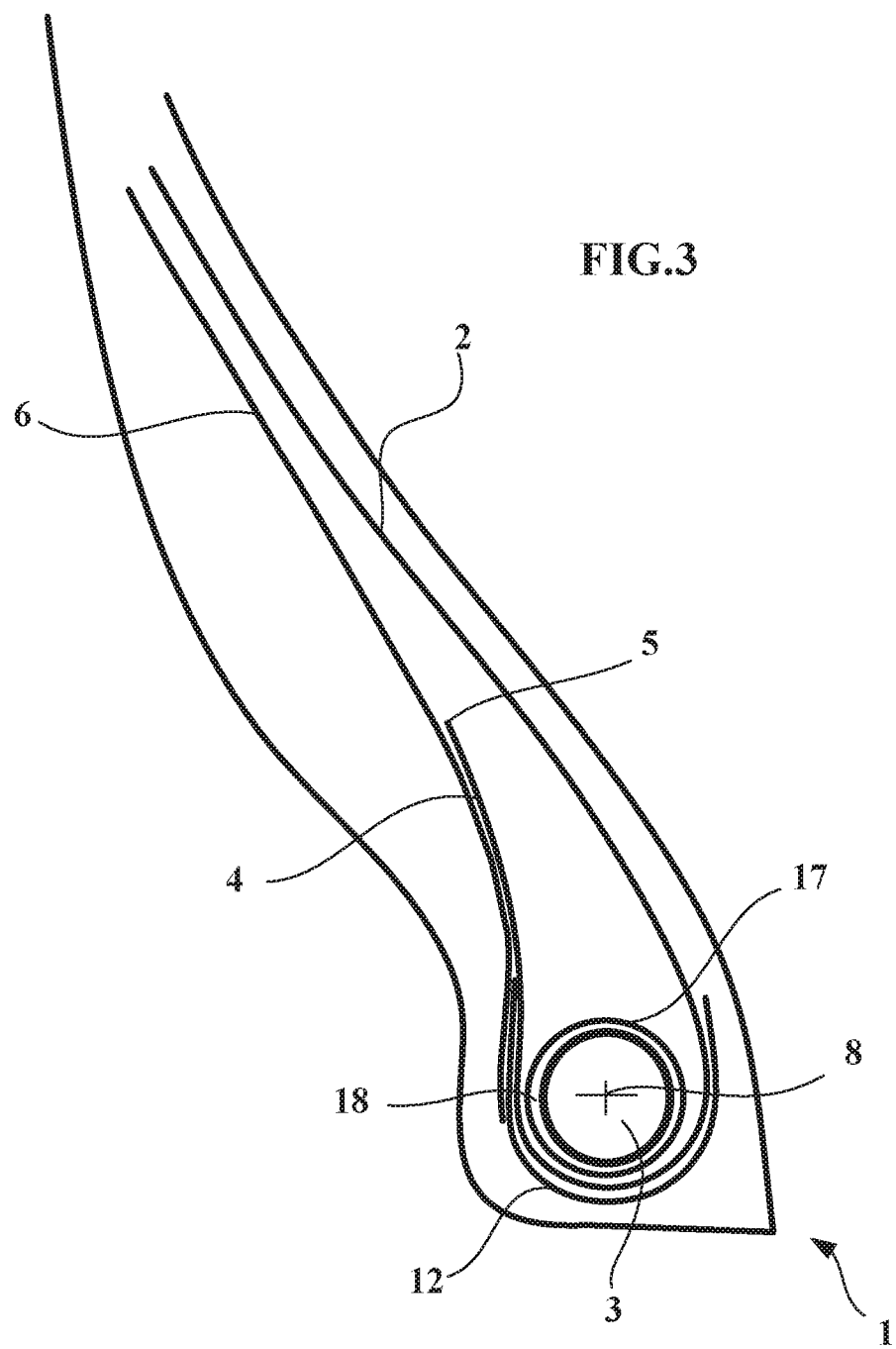

FIG. 3 illustrates a schematic depiction of a view in cross section of a bead 1 according to a third alternative form of embodiment of a tire according to the invention. This third alternative form differs from the second alternative form illustrated in FIG. 2 through the presence in each bead of a retaining reinforcement 17 surrounding the bead wire 3 and a volume of rubber compound 18 directly in contact with the bead wire.

Figure 4:
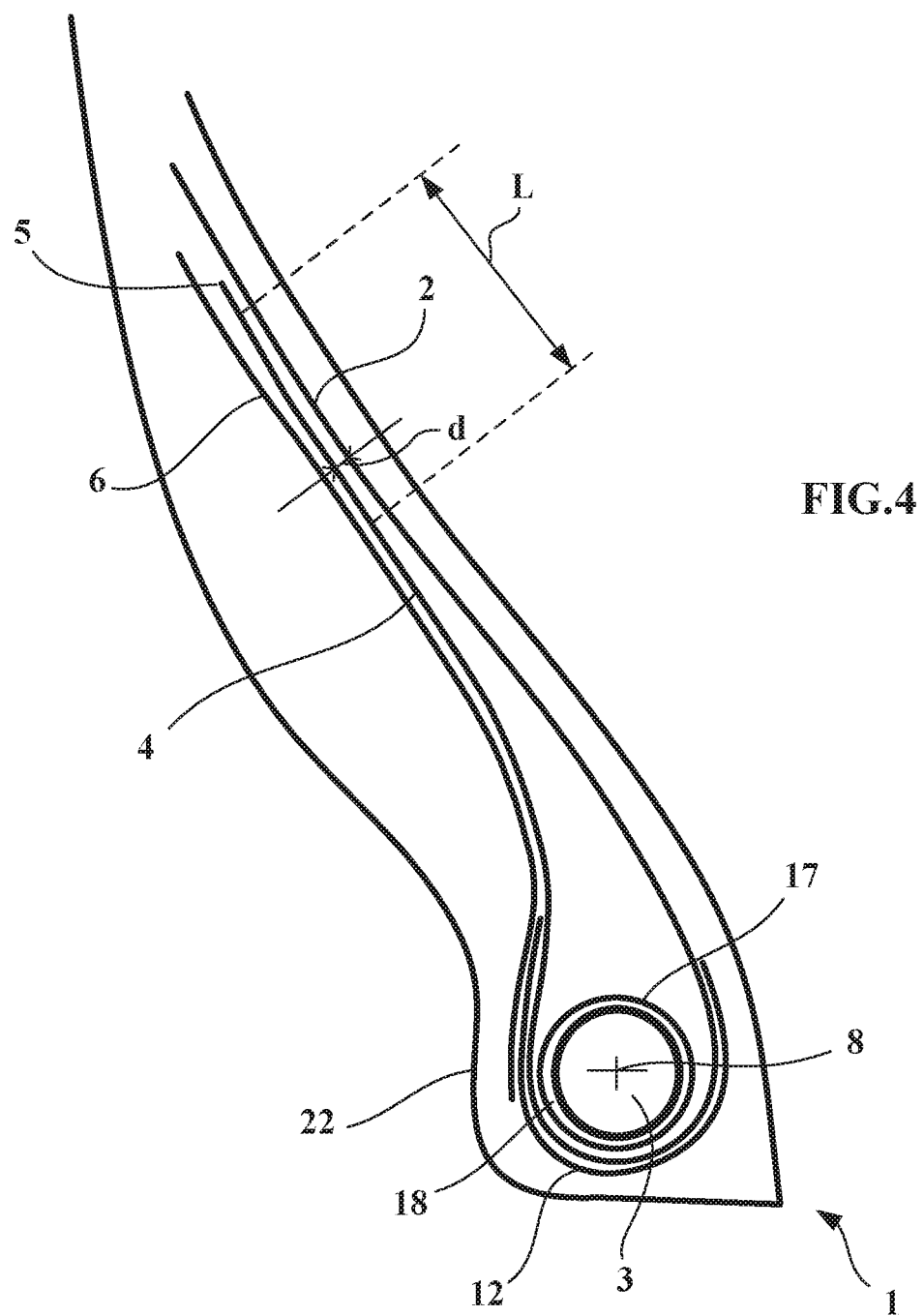

FIG. 4 illustrates a schematic depiction of a view in cross section of a bead 1 according to a fourth alternative form of embodiment of a tire according to the invention. This fourth alternative form differs from the third alternative form illustrated in FIG. 3 by one end 5 of the turnup 4 of the first layer of carcass reinforcement 2 that is radially further away from the bead wire. Furthermore, according to this fourth alternative form of the invention, the turnup 4 of the first layer of carcass reinforcement 2 is pressed firmly against the main part of the first layer of carcass reinforcement 2. This firm pressing results in a distance d at most equal to 1.9 mm over a length L equal to 20 mm. Over this length of 20 mm, the distance d varies between 1.2 and 1.9 mm.

The distance d is measured between the generatrix of a reinforcing element of the main part of the first layer of carcass reinforcement 2 and the generatrix of a reinforcing element of the turnup 4 of the first layer of carcass reinforcement 2 in a direction normal to the skim surfaces of the turnup 4 and of the main part of the first layer of carcass reinforcement 2.

Tires were produced using PET (polyethylene terephthalate) cords of count 334/2 for the first layer of carcass reinforcement 2 and cords of aromatic polyamide of count 210/3 for the second layer of carcass reinforcement 6.

The elongation of the cords made of aliphatic polyamide of count 210/3 is equal to 9.6% and therefore greater than 8% under a force of 20 daN.

The breaking force per unit width of the first layer of carcass reinforcement is equal to 3280 daN/dm and therefore greater than 2900 daN/dm. It is determined by the product of the density of reinforcing elements equal to 80 threads/dm, and of the breaking force of one reinforcing element, equal to 41 daN.

The breaking force per unit width of the second layer of carcass reinforcement is equal to 4028 daN/dm and therefore greater than 2900 daN/dm. It is determined by the product of the density of reinforcing elements, equal to 75 threads/dm, and of the breaking force of one reinforcing element, equal to 53.7 daN.

The minimum stiffness per unit width, measured for an elongation of less than 10%, of the first layer of carcass reinforcement is equal to 123 daN/dm/%. It is determined as the product of the density of reinforcing elements, equal to 80 threads/dm, and of the minimum stiffness of one reinforcing element, equal to 1.54 daN/%.

The minimum stiffness per unit width, measured for an elongation of less than 10%, of the second layer of carcass reinforcement is equal to 55 daN/dm/%. It is determined as the product of the density of reinforcing elements, equal to 75 threads/dm, and of the minimum stiffness of one reinforcing element, equal to 0.73 daN/%.

The minimum stiffness per unit width, measured for an elongation less than 10%, of the second layer of carcass reinforcement is therefore equal to a value equal to 45% of the minimum rigidity per unit width, measured for an elongation less than 10%, of the first layer of carcass reinforcement and therefore strictly greater than a value equal to 20% of the minimum rigidity per unit width, measured for an elongation of less 10%, of the first layer of carcass reinforcement.

Tests were performed using tires produced according to the invention and others using tires referred to as reference tires.

The tires according to the invention which were tested are in accordance with the depiction of FIG. 1.

The reference tires are standard tires of the same size comprising a single layer of carcass reinforcement turned up around a bead wire similar to the first layer of carcass reinforcement 2 depicted in FIG. 1 and comprising 12.18 metal cords.

Endurance tests were carried out on a test machine that forced each of the tires to run in a straight line at a speed varying from 50 to 110 km/h (the recommended speed rating for the tire is 120 km/h) under a load varying between the nominal load and 1.9 times the nominal load and at inflation pressures varying between 0.7 times and 1.1 times the nominal pressure.

A threshold level for the distance covered is defined in order to be able to consider the tires as being sufficiently durable.

All of the tires tested passed this test by exceeding the set threshold.

The tires according to the invention therefore lead to satisfactory performance notably in terms of endurance.

The mass of the reference tire is 21.9 kg.

The mass of the tire according to the invention of the first series (cords in the two layers of carcass reinforcement identical) is equal to 19.7 kg.

The mass of the tire according to the invention for the second series (different cords in the two layers of carcass reinforcement) is equal 19.7 kg.

The invention claimed is:

1. A tire with radial carcass reinforcement, having a load index higher than or equal to 118, comprising a crown reinforcement, itself capped radially by a tread, the said tread being connected to two beads, comprising a bead wire, by two sidewalls, the said carcass reinforcement being made up of two layers of textile reinforcing elements, a first layer of carcass reinforcement being turned up around the bead wire in each of the beads, the ends of the said first layer of carcass reinforcement being radially on the outside of the radially outermost point of the bead wire in each bead and the second layer of carcass reinforcement extending from one bead to the other without any turnup around the bead wire in each of the beads, its ends being axially on the outside of the axially outermost point of the bead wire in each bead, the said tire comprising in each sidewall a first filling element, axially on the inside of the exterior surface of a sidewall and axially on the outside of the turnup of the first layer of carcass reinforcement, and made of a rubber compound having a secant elastic modulus under tension at 10% elongation of Mj, each bead comprising a second filling element made of a rubber compound having a secant elastic modulus under tension at 10% elongation of Mt, extending the bead wire core radially towards the outside, wherein each of the layers of carcass reinforcement has a breaking force per unit width higher than 2900 daN/dm, wherein the minimum strength per unit width, measured for an elongation of less than 10%, of the second layer of carcass reinforcement is strictly greater than a value equal to 20% of the minimum strength per unit width, measured for an elongation of less than 10% of the first layer of carcass reinforcement, in that the reinforcing elements of the first layer of carcass reinforcement have a thread count higher than 300 tex, wherein the reinforcing elements of the two layers of carcass reinforcement have a thread count of less than 750 tex, wherein the elongation of the reinforcing elements of the second layer of carcass reinforcement is greater than 8% under a force of 20 daN and wherein the secant elastic modulus values under tension at 10% elongation, Mt, Mj, satisfy the relationship Mt/Mj≥1, wherein, in a meridian plane, in each bead, the tire comprises a layer of reinforcing elements made of aromatic polyamide in contact with the said first layer of carcass reinforcement over the entire length thereof, at least a part being radially on the inside of the bead wire and of which the ends are radially on the outside of the geometric center of the bead wire, and wherein the said first layer of carcass reinforcement is interposed between the bead wire and the layer of reinforcing elements made of aromatic polyamide.

2. The tire according to claim 1, wherein, in a meridian plane, a single layer of reinforcing elements is present axially between the exterior surface of the tire and the turnup of the first layer of carcass reinforcement in a zone delimited radially towards the outside by the axial direction passing through the end of the turnup of the first layer of carcass reinforcement and radially towards the inside by the axial direction passing through the intersection of the straight line passing through centre O of curvature of the zone of the tire that comes to bear on the rim flange, intended to accept the tire, and making an angle of 45° with the axial direction and the turnup of the first layer of carcass reinforcement.

3. The tire according to claim 1, wherein the reinforcing elements of the first layer of carcass reinforcement are different from those of the second layer of carcass reinforcement.

4. The tire according to claim 1, the second layer of carcass reinforcement being made up of reinforcing elements between two skim layers formed of rubber compound having a secant elastic modulus under tension at 10% elongation of $Mc_2$, wherein the secant elastic modulus values under tension at 10% elongation, $Mc_2$, Mj, satisfy the relationship $0.6 \leq Mc_2/Mj \leq 4$ and preferably satisfy the relationship $Mc_2/Mj \leq 4$.

5. The tire according to claim 1, the layers of carcass reinforcement being made up of reinforcing elements between two skim layers formed of rubber compound having a secant elastic modulus under tension at 10% elongation, denoted $Mc_1$ for the first layer of carcass reinforcement and $Mc_2$ for the second layer of carcass reinforcement respectively, wherein the secant elastic modulus values under tension at 10% elongation $Mc_1$, $Mc_2$ satisfy the relationship $Mc_2/Mc_1 \leq 4.6$.

6. The tire according to claim 1, wherein, in any meridian plane, in each bead, the tire comprises a retention reinforcement surrounding the bead wire and a volume of rubber compound directly in contact with the bead wire.

7. The tire according to claim 1, the first layer of carcass reinforcement forming a main part between the two bead wires and a turnup in each of the beads, wherein, in any meridian plane, in each bead, the turnup of the first layer of carcass reinforcement is distant from the main part by a distance d of between 0.5 and 3.2 mm over a length of at least 15 mm.

8. The tire according to claim 1, wherein the direction passing through the center O of curvature of the zone of the tire that comes to bear against the flange of the rim intended to accept the tire, and the axially external end of the layer of reinforcing elements made of aromatic polyamide makes an angle α of between 0 and 45° with the axial direction.

9. The tire according to claim 1, wherein the direction passing through the center O of curvature of the zone of the tire that comes to bear against the flange of the rim intended to accept the tire and the axially interior end of the layer of reinforcing elements made of aromatic polyamide makes an angle β of between 0 and 20° with the axial direction.

10. The tire according to claim 1, wherein, in any meridian plane, in each bead, the end of the second layer of carcass reinforcement is axially on the outside of the geometric center of the bead wire, and in that the direction passing through the geometric center of the bead wire and the end of the second layer of carcass reinforcement makes an angle θ of less than 50° with the axial direction.

11. The tire according to claim 1, wherein the distance between the end of the second layer of carcass reinforcement and the axially outermost end of the layer of reinforcing elements made of aromatic polyamide is greater than 5 mm.

* * * * *